(12) United States Patent
Fan et al.

(10) Patent No.: US 12,027,976 B2
(45) Date of Patent: Jul. 2, 2024

(54) DC-DC CONVERTER WITH SELECTABLE WORKING MODE

(71) Applicant: University of Electronic Science and Technology of China, Chengdu (CN)

(72) Inventors: Hua Fan, Chengdu (CN); Yilin Liu, Chengdu (CN); Huichao Yue, Chengdu (CN); Kai Xu, Chengdu (CN); Quanyuan Feng, Chengdu (CN); Huaying Su, Chengdu (CN); Guosong Wang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 233 days.

(21) Appl. No.: 17/683,572

(22) Filed: Mar. 1, 2022

(65) Prior Publication Data

US 2023/0122410 A1   Apr. 20, 2023

(30) Foreign Application Priority Data

Oct. 15, 2021   (CN) .......................... 202111202536.8

(51) Int. Cl.
*H02M 3/158*   (2006.01)
*H02M 1/00*    (2006.01)
*H02M 1/08*    (2006.01)

(52) U.S. Cl.
CPC .......... *H02M 3/158* (2013.01); *H02M 1/0009* (2021.05); *H02M 1/08* (2013.01)

(58) Field of Classification Search
CPC ...... H02M 3/158; H02M 1/0009; H02M 1/08; H02M 1/0025
See application file for complete search history.

(56) References Cited

U.S. PATENT DOCUMENTS

| | | | |
|---|---|---|---|
| 7,348,765 B2 * | 3/2008 | Nishida | H02M 3/156 323/282 |
| 2007/0182392 A1 * | 8/2007 | Nishida | H02M 3/156 323/282 |
| 2011/0241641 A1 * | 10/2011 | Chen | H02M 3/1588 323/284 |

* cited by examiner

*Primary Examiner* — Kyle J Moody
(74) *Attorney, Agent, or Firm* — Andrew D. Fortney; Central California IP Group, P.C.

(57) ABSTRACT

A DC-DC converter circuit with selectable working modes is disclosed. Compared with the traditional chip that works in one mode, the DC-DC converter with selectable working modes adds only a mode selection circuit, so that the chip can work in voltage control mode or current control mode. On the one hand, the applications of the chip are more extensive, and on the other hand, when the applications are different, the cost of developing a DC-DC converter with selectable working mode is greatly reduced compared with the traditional DC-DC converter.

11 Claims, 7 Drawing Sheets

DC-DC CONVERTER WITH SELECTABLE WORKING MODE

TECHNICAL FIELD

The present invention belongs to the field of DC-DC converters.

BACKGROUND TECHNIQUE

The DC-DC converter is a DC-DC converter that detects the output voltage through a feedback loop, changes the working state of the switch tube through the driving circuit, and adjusts the output voltage and current, so as to achieve a stable output voltage under different application conditions. Compared with ordinary linear power supplies, the significant advantages of switching power supplies with high efficiency and wide output voltage adjustment range enable it to better meet the power supply requirements of various electronic devices.

DC-DC switching power supplies include BUCK, BOOST and BUCK-BOOST topologies. The control methods of switching power supplies include pulse width modulation (Pulse Width Modulation, PWM) and pulse frequency modulation (Pulse Frequency Modulation, PFM). Among them, the PWM modulation mode mainly includes voltage mode control and current mode control. In voltage control mode, the system has only one voltage control loop, which has nothing to do with the inductor current. The loop is adjusted by monitoring the change of output voltage, so it has good anti-interference ability, but its response speed is slow; current control mode includes two control loops, which simultaneously monitor the changes in voltage and current and feed them back into the loop for adjustment, so their response speed is relatively faster. But because the control ramp signal of the current control mode is generated by the inductor current, when the input voltage increases, the slope will also increase. So, in comparison, its sensitivity to input disturbance is lower than that of the voltage control mode. By comparing voltage mode control and current mode control DC-DC converters, it is not difficult to see that voltage mode control is more suitable for applications that are more sensitive to noise but do not require high dynamic response speed of the system. On the contrary, current mode control is suitable for applications that require higher dynamic response speed of the system and are not sensitive to noise.

The traditional DC-DC switching power supply circuit contains only one of the PWM modulation modes (voltage control mode or current control mode), which makes different chips needed for different applications. However, to develop two types of chips separately requires relatively higher R&D costs and labor costs, and takes a longer time. Therefore, how to freely select different control modes according to different applications in order to better adapt to the applications, as well reducing R&D costs and labor costs are issues that need to be considered.

SUMMARY OF THE INVENTION

Aiming at the problem of the single control mode of the traditional DC-DC switching power supply circuit in the background technology, a DC-DC converter with selectable working modes is disclosed.

This technical solution provided by the present invention is a DC-DC converter circuit with selectable working modes. The circuit includes: a driving circuit, a current sensing circuit, an oscillator, a mode selection circuit, a pulse width modulator, a slope compensation circuit, an error amplifier EA, a compensation module, an NMOS transistor M1, an NMOS transistor M2, an inductor L, a capacitor C, a resistor RF1, a resistor RF2, and a resistor RL;

The driving circuit includes one input terminal and two output terminals, the current sensing circuit includes four input terminals and one output terminal, and the slope compensation circuit includes three input ports and one output port;

The drain of M1 is connected to the input port 2 of the current sensing circuit and then connected to the positive terminal of the input current source. The source of M1, the drain of M2, the input port 3 of the current sensing circuit, and one end of the inductor L are connected to each other. The gate of M1, the input port 1 of the current sensing circuit, and the input port 1 of the driving circuit are connected together. The input port 2 of the driving circuit is connected to the gate of M2. The other end of the inductor L, one end of the capacitor C, one end of the resistor RL, and one end of RF1 is connected in common. The other end of resistor RF1 is connected to one end of resistor R2. The source of M2, the other end of capacitor C, the other end of resistor RL, and the other end of resistor RF2 are connected together then to the negative end of the input current source and grounded; the common contact of resistor RF1 and resistor RF2 is connected to the negative terminal of the error amplifier EA. The positive terminal of the error amplifier EA is input with the reference voltage VREF, the output terminal of the error amplifier EA is connected to the negative terminal of the pulse width modulator, and the output terminal of the pulse width modulator is connected to the input end of the driving circuit; the input end of the mode selection circuit is connected to the mode selection signal Mode Select, the output ends are respectively connected to the input port 4 of the current sensing circuit and the input port 3 of the slope compensation circuit, and the output port of the current sensing circuit is connected to the input port 1 of the slope compensation circuit. The output port of the oscillator is connected to the input port 2 of the slope compensation circuit, and the output port of the slope compensation circuit is connected to the positive terminal of the pulse width modulator;

The compensation module includes an operational amplifier A1, a variable resistor R1, a variable resistor R2, and a variable capacitor C2. The output terminal of the operational amplifier A1 is connected to the input negative terminal, which is connected to the positive terminal through a variable resistor R2. The positive terminal is also connected to one end of the variable resistor R1 whose other end is connected with the variable capacitor C2 and then connected to the negative terminal of the pulse width modulator, and the other end of the variable capacitor C2 is grounded;

The current sensing circuit includes: bias current source $I_{BIAS2}$, NMOS transistors MN10, MN11, MN12, MN13, MN14, MN15, PMOS transistors MP8, MP9, MP10, and resistor R5; one end of the bias current source $I_{BIAS2}$ is connected to the internal power supply voltage VCC, the other end is connected to the drain of MN10. The gate of MN10 is the input port 4 of the current sensing circuit, the source of MN10 is connected to the drain and gate of MN11, and the gates of MN12 and MN13, and the sources of MN11, MN12 and MN13 are grounded. The drain of MN12 is connected to the drain and gate of MP8, and the gate of MP9. The source of MP8 is connected to the sources of MP10 and MN14. The gates of MN14 and MN15 are connected together as input port 1 of the current sensing circuit. The drain of MN14 is used as the input port 2 of the current sensing circuit. The drain of MN15 is used as the input port 3 of the current sensing circuit. The source of MN15 is connected to the source of MP9. The drain of MP9, the gate of MP10 and the drain of MN13 are connected. The drain of MP10 and one end of R5 are connected together as the output terminal of the current sensing circuit, the output signal is $V_{SENSE}$, and the other end of R5 is grounded;

The slope compensation circuit includes: an operational amplifier A2, a resistor R4, PMOS transistors MP5, MP6 and MP7, NMOS tubes MN4, MN5, MN6, MN7, MN8 and MN9, capacitors C5 and C6; the negative terminal of the operational amplifier A2 is connected to the reference voltage $V_{REF2}$, the positive terminal is connected to one end of the resistor R4 and the source of MP5, the output of the operational amplifier A2 is connected to the gate of MP5, the other end of the resistor R4 is connected to the power supply voltage VIN, the drain of MP5, the gate and drain of MN6, and the gates of MN4, MN5 and MN7 are connected in common, the source of MN6 is connected to the drain of MN4, the source of MN4 is grounded, the source of MN7 is connected to the drain of MN5, the source of MN5 is grounded, the drain of MN7, and the drain and the gate of MP6 and the gate of MP7 are connected together, the sources of MP6 and MP7 are connected to the internal power supply voltage VCC, the drain of MP7, one end of the capacitor C5, the drain of MN8, and the drain of MN9 are connected together as the output end of the slope compensation circuit. The gate of MN8 is used as the input port 3 of the slope compensation circuit. The source of MN8 is connected to one end of the capacitor C6, the other ends of the capacitors C5 and C6 and the source of MN9 are connected together as the input port 1 of the slope compensation circuit. The gate of MN9 is used as the input port 2 of the slope compensation circuit.

Furthermore, the mode selection circuit includes: a resistor R, a diode D, an inverter INV1 and an inverter INV2; one end of the resistor R is connected to the mode selection signal, and the other end is connected to one end of the diode D, which is connected in common to the input of the inverter INV1. The other end of the diode D is grounded, the output of the inverter INV1 is connected to the input of the inverter INV2, and the output of the inverter INV2 is the output of the entire mode selection circuit.

Furthermore, the circuits of the variable resistor $R_1$ and the variable resistor $R_2$ are two parallel branches, one end is the input end and the other is the output end. Each branch includes a plurality of resistors and a switch, and the switch is a MOS transistor.

Furthermore, the circuits of the variable capacitor C2 are two parallel branches, one end is the input end and the other is the output end, each branch includes a switch and a plurality of parallel capacitors, and the switch is a MOS transistor.

In some embodiments, the oscillator circuit includes: a bias current source IBIAS1, a resistor R3, NMOS transistors MN1 and MN2, PMOS transistors MP0, MP1, MP2, MP3, MP4 and MP5, capacitors C3 and C4, comparators COMP1 and COMP2, RS flip-flops and inverters INV3, INV4, INV5 and INV6; one end of the bias current source IBIAS1 is grounded, and the other end is connected to one end of the resistor R3, the gate of MP0, the gate of MP2, and the gate of MP4. The other end of R3 is connected to the drain of MP0, the gate of MP1, the gate of MP3 and the gate of MP5. The source of MP0 is connected to the drain of MP1, and the sources of MP1, MP3 and MP5 are connected to the internal power supply voltage VCC. The drain of MP3 is connected to the source of MP2, the drain of MP5 is connected to the source of MP4, the source of MP2 is connected to one end of the capacitor C3, the drain of MN1, and the positive terminal of the comparator COMP2, and the other end of the capacitor C3 is grounded with the source of MN1. The drain of MP4 is connected to one end of the capacitor C4, the drain of MN2 and the positive end of the comparator COMP1, the other end of the capacitor C4 and the source of MN2 are grounded. The negative terminal of the comparator COMP1 and the comparator COMP2 is connected to the reference voltage VREF1, the output of the comparator COMP1 is connected to the R terminal of the RS flip-flop, the output of the comparator COMP2 is connected to the S terminal of the RS flip-flop, and the output $\overline{Q}$ of the RS flip-flop is connected to the inputs of the inverter INV3 and the inverter INV5. The output of the inverter INV3 is connected to the input of the inverter INV4, the output of the inverter INV4 is connected to the clock signal CLK, the output of the inverter INV5 is connected to the gate of MN2 and the input of the inverter INV6, and the output of the inverter INV6 is connected to the gate of MN1; the clock signal CLK is the output signal of the oscillator.

The beneficial effect of the present invention is that compared with a conventional chip that works in one mode, the disclosed DC-DC converter with selectable working mode only adds a mode selection circuit, so that the chip can work in a voltage control mode or in the current control mode. On the one hand, the chip application are more extensive; on the other hand, when the application are different, the cost of current invention, comparing with the cost of developing two chips in all aspects, is greatly reduced.

DETAILED WAYS

It should be understood that the specific embodiments described here are only used to clearly describe the technical advantages of the present invention, and are not used to limit the present invention.

Figure 1:
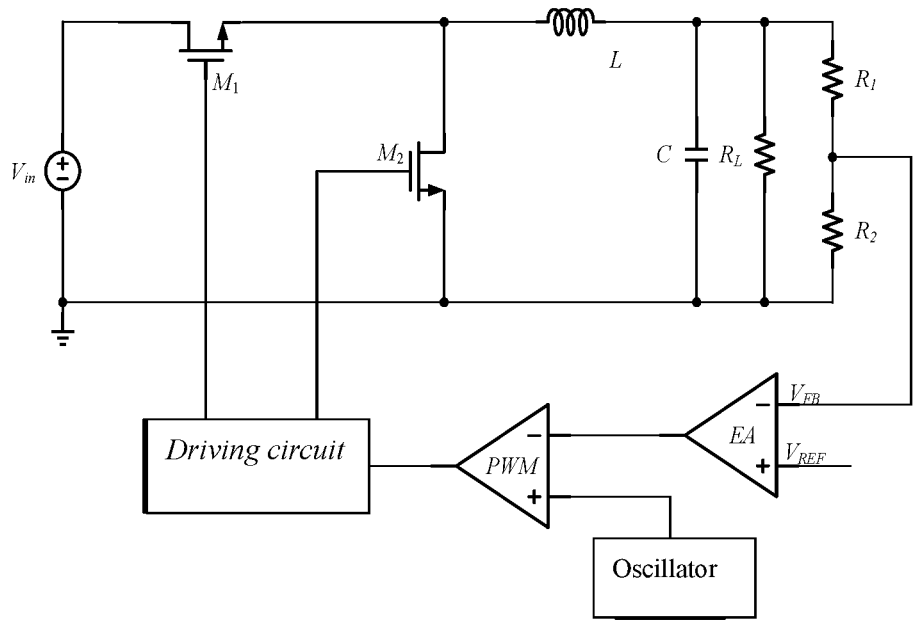
FIG. 1: A traditional voltage mode control DC-DC converter circuit.

The content of the present invention will be described in detail below with reference to the accompanying figures:

FIG. 1 is a traditional voltage mode control DC-DC converter circuit. It can be seen that the feedback control loop is only controlled by the output voltage. When the input voltage changes suddenly or the load impedance changes suddenly, because of the large phase shift delay effect of the output capacitance and inductance, the output voltage change is also delayed. The change of output voltage has to pass the delay of the compensation circuit of the voltage EA comparator before it can be transmitted to the pulse width modulator for pulse width modulation. Therefore, the delay of the entire system is relatively large, the dynamic response speed is slow, and the linear adjustment rate is poor. At the same time, because the system has only one voltage feedback loop, which has nothing to do with the inductor current, it has better anti-interference ability than the current control mode.

Figure 2:
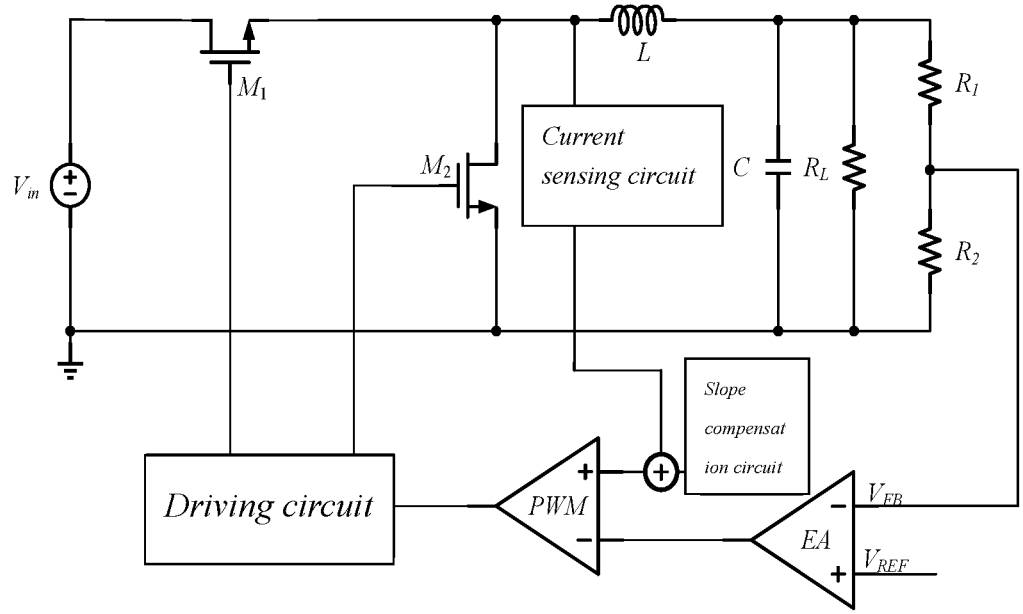
FIG. 2: A traditional current mode control DC-DC converter circuit.

FIG. 2 is a traditional current mode control DC-DC converter circuit. Since the control slope signal of the current control mode is generated by the inductor current, when the input voltage increases, the slope will also increase. Therefore, the current control mode is more sensitive to input disturbance than the voltage control mode. Current mode control controls the sudden change of input voltage without introducing the delay of LC filter, EA comparator and other modules. Therefore, the current loop has an obvious speed advantage over the voltage loop, so the transient response performance of the current mode control is better than that of the voltage mode control.

Figure 3:
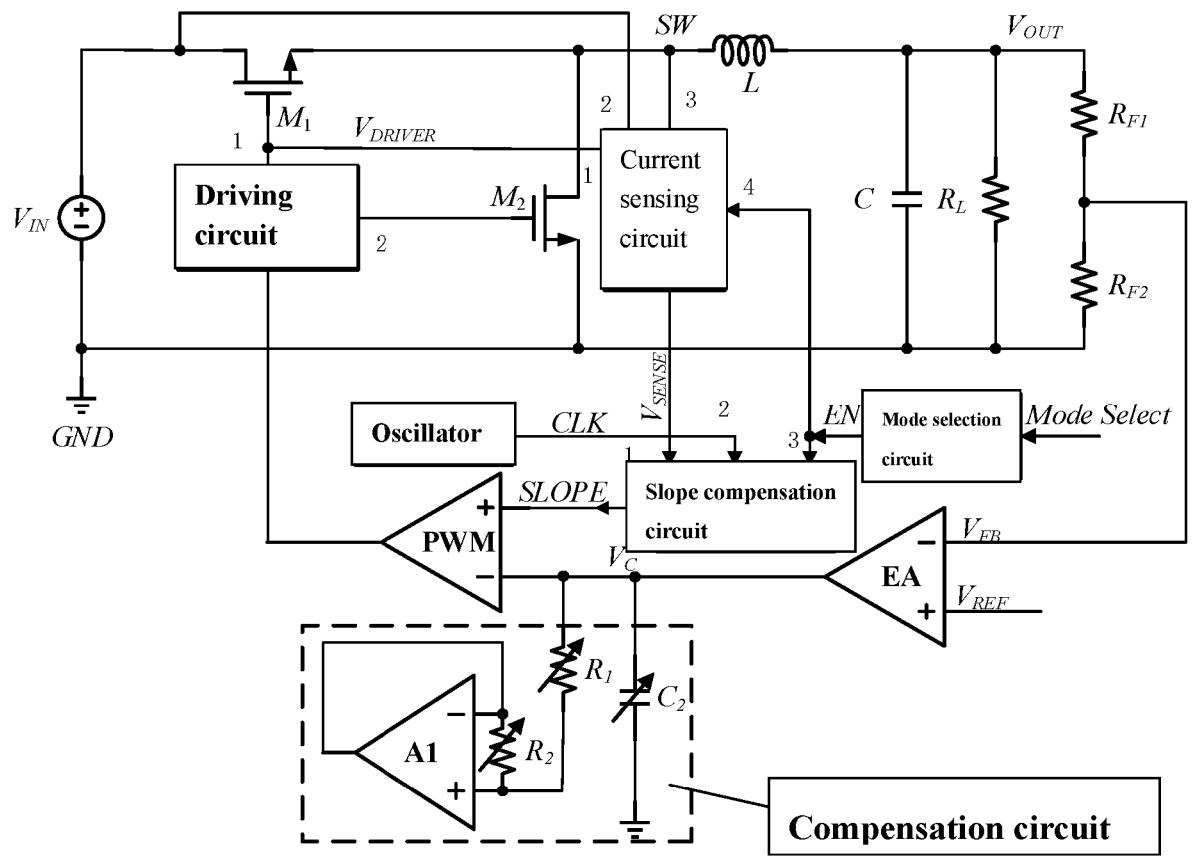
FIG. 3: The DC-DC converter circuit with selectable working modes according to the present invention.

FIG. 3 is a DC-DC converter circuit with selectable working modes according to the present invention, including a switching power supply module, a mode selection circuit, a current sensing circuit, a compensation module, an oscillator, an EA comparator and a driving circuit.

When the input signal Mode Select of the mode selection module (the pin of chip, input by the user) is high, the output enable signal (EN) (high level) selects the system to work in the current mode. At this time, the enable signal (EN) is output to the current sensing circuit, slope compensation circuit and compensation module. Enable the current sensing circuit, at this time the output of the slope compensation circuit adapts to the current mode, that is, the signal input to the positive input of the comparator is the superposition of the signal detected from the inductance and the output signal of the slope compensation circuit, making the circuit work normally in the current mode and controlling the value of capacitance and resistance in the compensation module so that the system can work stably in current mode.

When the input signal "Mode Select" is low, an enable signal (low level) is output, and the system selects to work in voltage mode. At this time, the enable signal is output to the current sensing circuit, the slope compensation circuit and the compensation module. The enable signal turns off the current detection module, and at the same time allows the output of the slope compensation module to adapt to the voltage mode, that is, the slope signal "SLOPE" is a triangular wave signal in the voltage mode. At this point, the positive input of the comparator only has the output signal of the slope compensation circuit, with the system working in voltage mode, and controls the capacitance and resistance values in the compensation module so that the system can work stably in voltage mode.

In the process of switching between voltage mode and current mode, because the control loop of the system has changed, in order to maintain the stability of the system, the compensation module of the system must be automatically adapted to different control modes, so that the system can always work stably. One way is to use the output of the EA comparator as a pin of the chip, allowing the user to design a compensation network according to the circuit working parameters and control mode. The other way is an internal loop compensation, which means that users do not need to undertake the complicated work of calculating loop compensation components. This requires the system to adaptively change the value of the loop compensation component when the system is working in different modes, so that the system can maintain stability in both modes.

Herein, we take the DC-DC step-down converter as an example to illustrate the loop compensation module. Traditional voltage mode control generally chooses type III compensation to make the system stable, but large resistance and large capacitance are not easy to use silicon technology to achieve, and also difficult to be integrated into the system. The equivalent series resistance of the higher output capacitor can provide a 90° phase lead within the crossover frequency. In other words, using the equivalent series resistance can simplify the compensation network without affecting the bandwidth. Therefore, the compensation network only needs a zero point, a main pole at the origin, and a high-frequency pole to reduce noise. That is, type II compensation can be used when there is an equivalent series resistance zero. When the system is working in current mode, type II compensation is usually used to stabilize the system, so the above compensation method is still applicable to current mode, but it should be noted that in current mode, the equivalent series resistance should be as small as possible so as not to affect the stability of the system loop.

Figure 4:
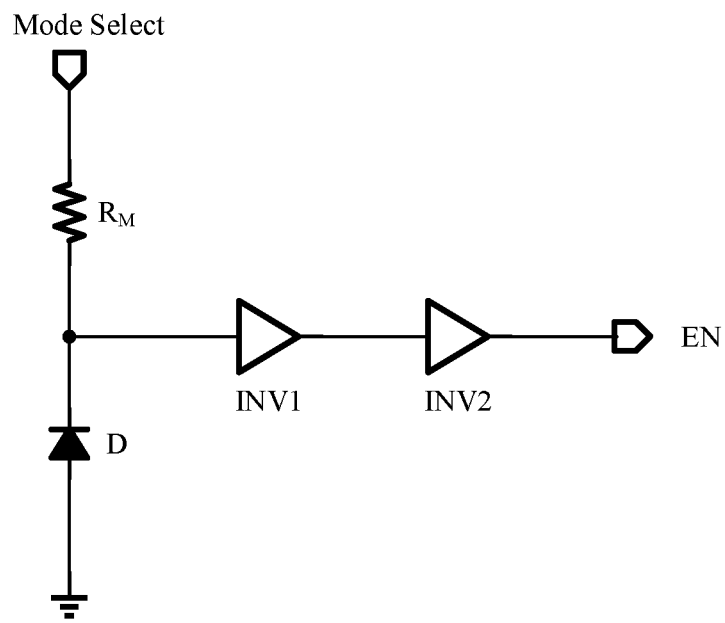
FIG. 4: The mode selection circuit of the present invention.

However, the capacitor $C_1$ in type II compensation is a nanofarad capacitor and cannot be integrated inside the chip. Considering this, a frequency compensation (capacitance multiplier) circuit is used for equivalent realization, as shown in FIG. 4. The output of amplifier A1 will produce a pole. Connect the amplifier into a follower structure, and feed the output resistance to the input terminal. The poles of the output terminal can be introduced to the input terminal, so that the input terminal impedance is capacitive. The required capacitive impedance can be obtained by adjusting the parameters of the amplifier and the feedback resistor $R_2$.

Figure 5:
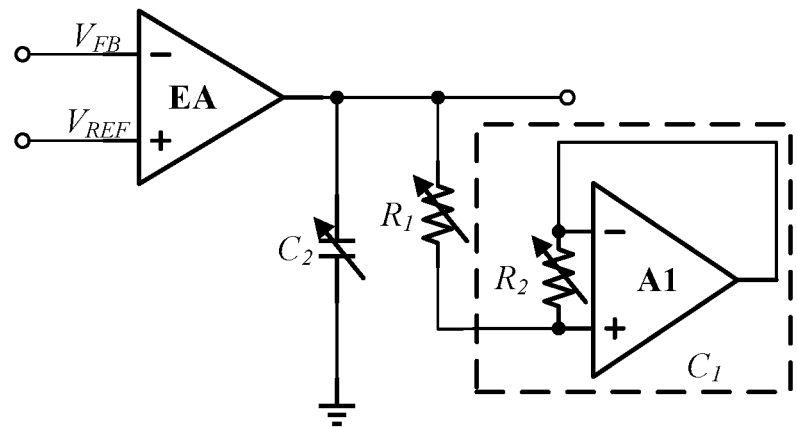
FIG. 5: The compensation module circuit of the present invention.

The resistors $R_1$, $R_2$, and capacitor $C_2$ in FIG. 5 are variable, and the values of the resistors and capacitors are controlled by the enable signal "EN" from the output signal of the mode selection module, so that the system can work stably regardless of the voltage mode or the current mode.

When the user selects the system to work in the voltage mode, the control signal changes the values of the variable resistor and the variable capacitor, so that the loop can be stable in the voltage mode. When the user selects the system to work in the current mode, the control signal changes the values of the variable resistor and the variable capacitor, so that the loop can be stable in the current mode. The compensation method in the two modes is type II compensation. The difference is that the equivalent series resistance for the capacitor selected in the voltage mode is slightly larger to generate a zero to offset the influence of the conjugate pole of the output filter stage, and the equivalent series resistance is not required in the current mode.

In voltage mode, an alternative structure using type II compensation generates two poles and one zero. The first pole is ideally located at the origin, and the zero is placed below the conjugate pole to provide a 90° phase lead. The second pole is located at the high frequency to suppress the high frequency noise of the system, and the zero generated by the equivalent series resistance is used to compensate the phase delay caused by the conjugate pole (designed by the user), which is equivalent to the second zero in type III compensation.

In the current mode, the alternative structure of type II compensation is used to generate two poles and a zero. The first pole has the same function as in the voltage mode. It is used to introduce the main pole, and the zero is used to compensate the output pole, but the pole position has changed. Therefore, the position of the compensation zero point needs to be adjusted, and the second pole has the same function as the voltage mode to suppress high-frequency noise of the switch.

The on-chip compensation transfer function and poles are calculated as follows in the two modes:

$$A(s) = -K_H \cdot \frac{\left(1+\frac{s}{w_{z1}}\right)}{\left(1+\frac{s}{w_{p1}}\right)\left(1+\frac{s}{w_{p2}}\right)}$$

Derivatives can be obtained:

$$w_{p1} \approx \frac{1}{C_1 R_O} \quad w_{z1} = \frac{1}{C_1 R_1} \quad w_{p2} \approx \frac{1}{C_2 R_1}$$

$R_O$ is the output impedance of the operational amplifier A1, and $C_1$ is the equivalent capacitor of the dashed box in FIG. 4, and its value can be realized by adjusting the value of $R_2$.

Figure 6:
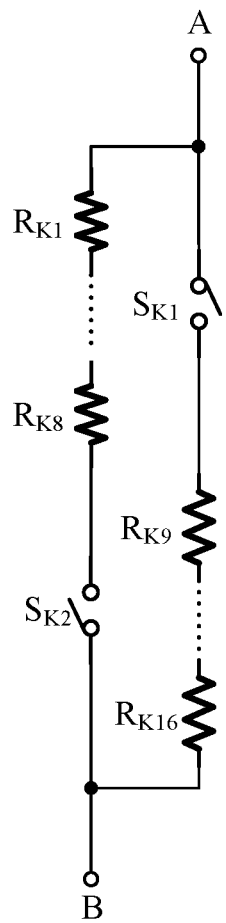
FIG. 6: The circuit of the variable resistor R1 and the variable resistor R2 of the present invention.

FIG. 6 shows the circuit structure of variable resistors $R_1$ and $R_2$. In the voltage control mode, the enable signal is low, the switch $S_{K1}$ is a PMOS switch, the switch $S_{K2}$ is a NMOS switch, and the enable signal is connected to the gates of the switches. When the switch $S_{K1}$ is on and the switch $S_{K2}$ is off in FIG. 6, the value of $R_1$ is:

$$R_1 = R_{AB} = R_{K9} + R_{K10} + R_{K11} + R_{K12} + R_{K13} + R_{K14} + R_{K15} + R_{K16}.$$

In the same way, the value of $R_2$ can be obtained. In the current mode, the enable signal EN is high. When the switch $S_{K1}$ is off and the switch $S_{K2}$ is on in the figure, the value of $R_1$ can be obtained:

$$R_1 = R_{AB} = R_{K1} + R_{K2} + R_{K3} + R_{K4} + R_{K5} + R_{K6} + R_{K7} + R_{K8}$$

In the same way, the value of $R_2$ can be obtained. The circuit structures of resistors $R_1$ and $R_2$ are both shown in FIG. 6. Although the circuit structures are the same, the resistance values in the structures are different. The resistance value of $R_{AB}$ is controlled by turning off or on the switch in the control signal control diagram, so that the resistance value required by the compensation network can be obtained in the two modes.

Figure 7:
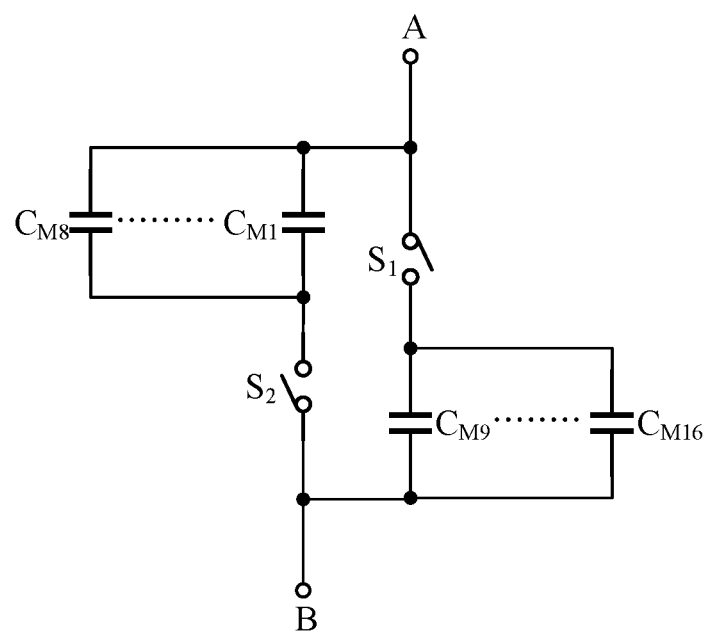
FIG. 7: The variable capacitor C2 circuit in the present invention.
Figure 8:
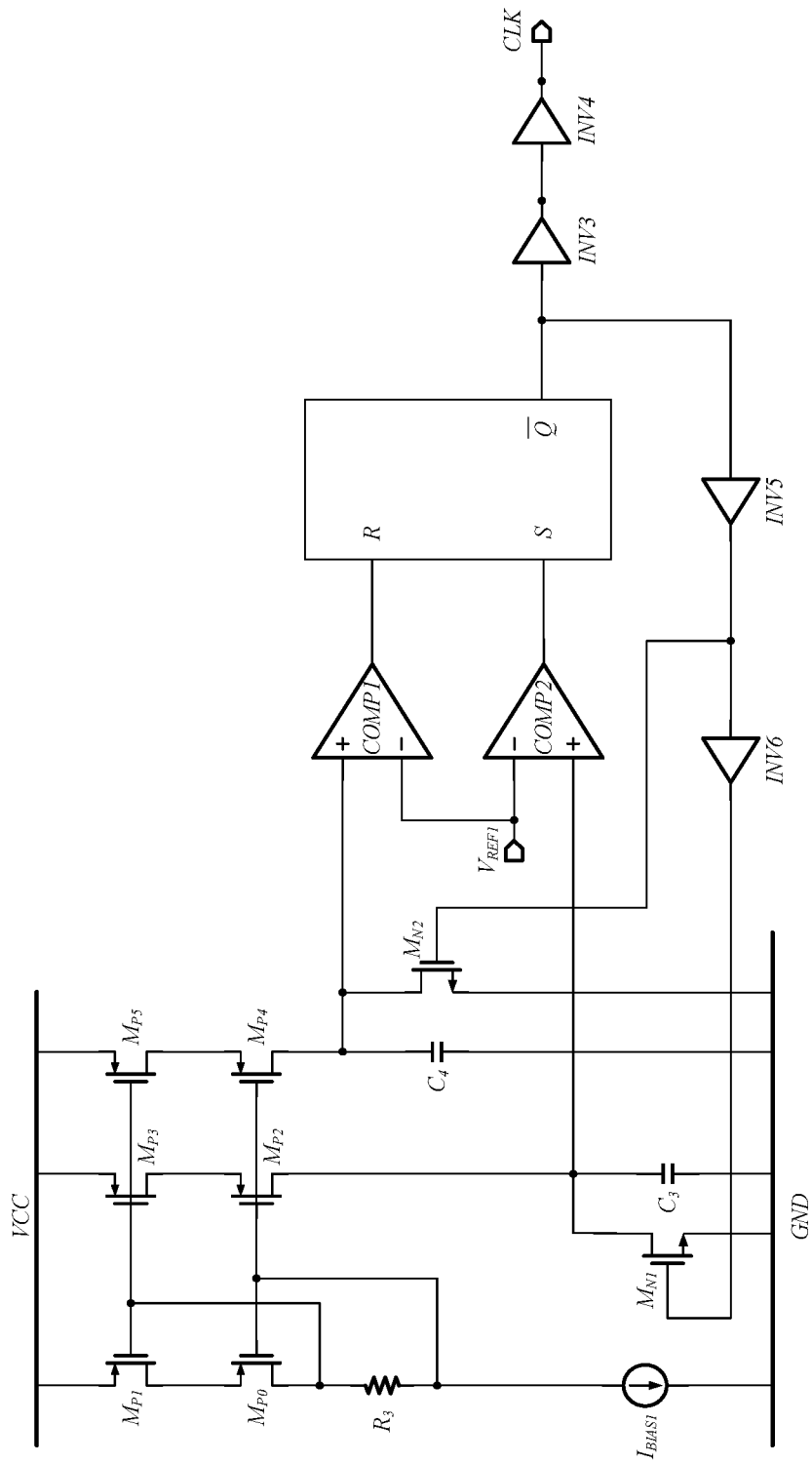
FIG. 8: The oscillator circuit in the present invention.
Figure 9:
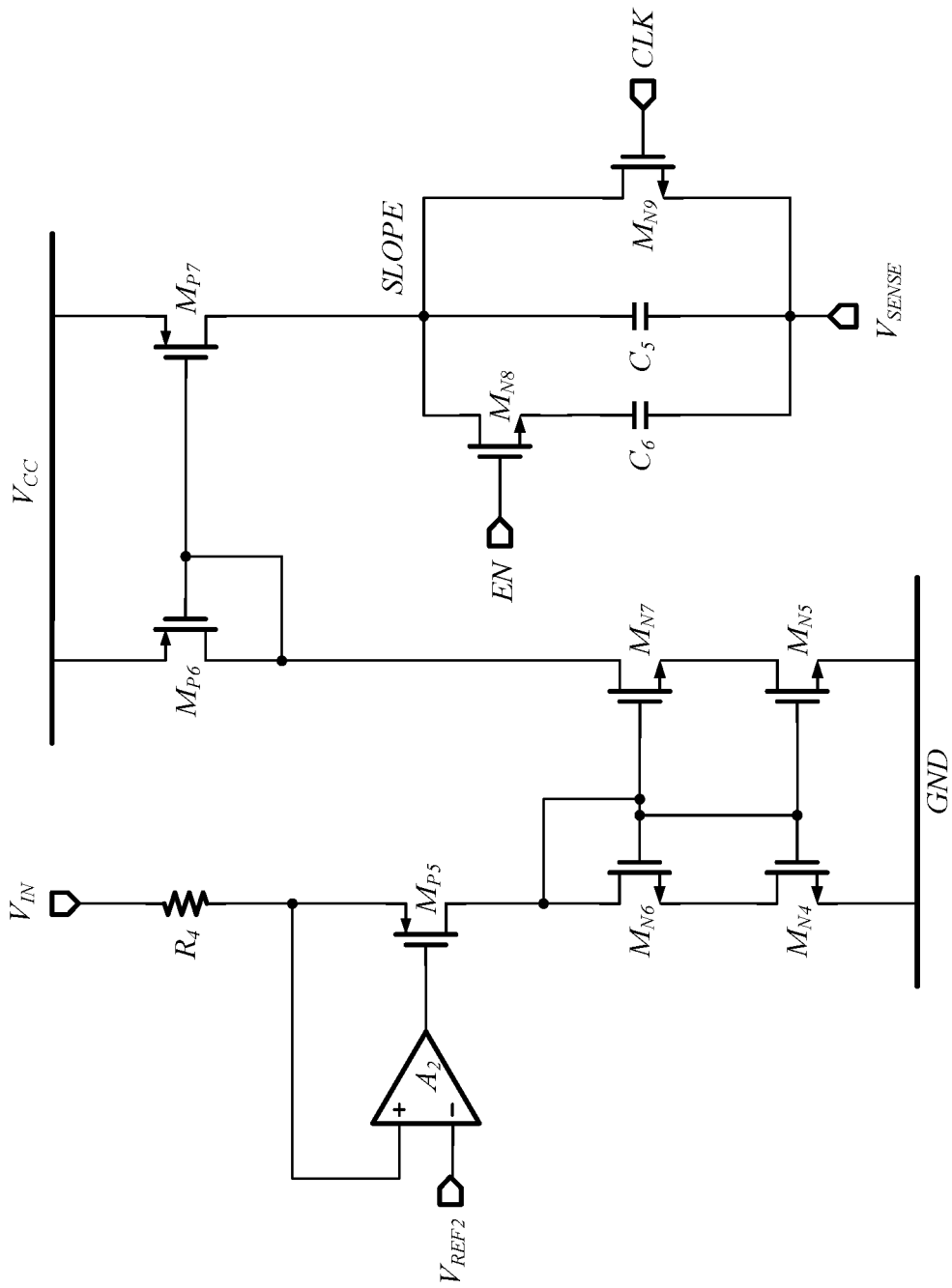
FIG. 9: The slope compensation circuit in the present invention.
Figure 10:
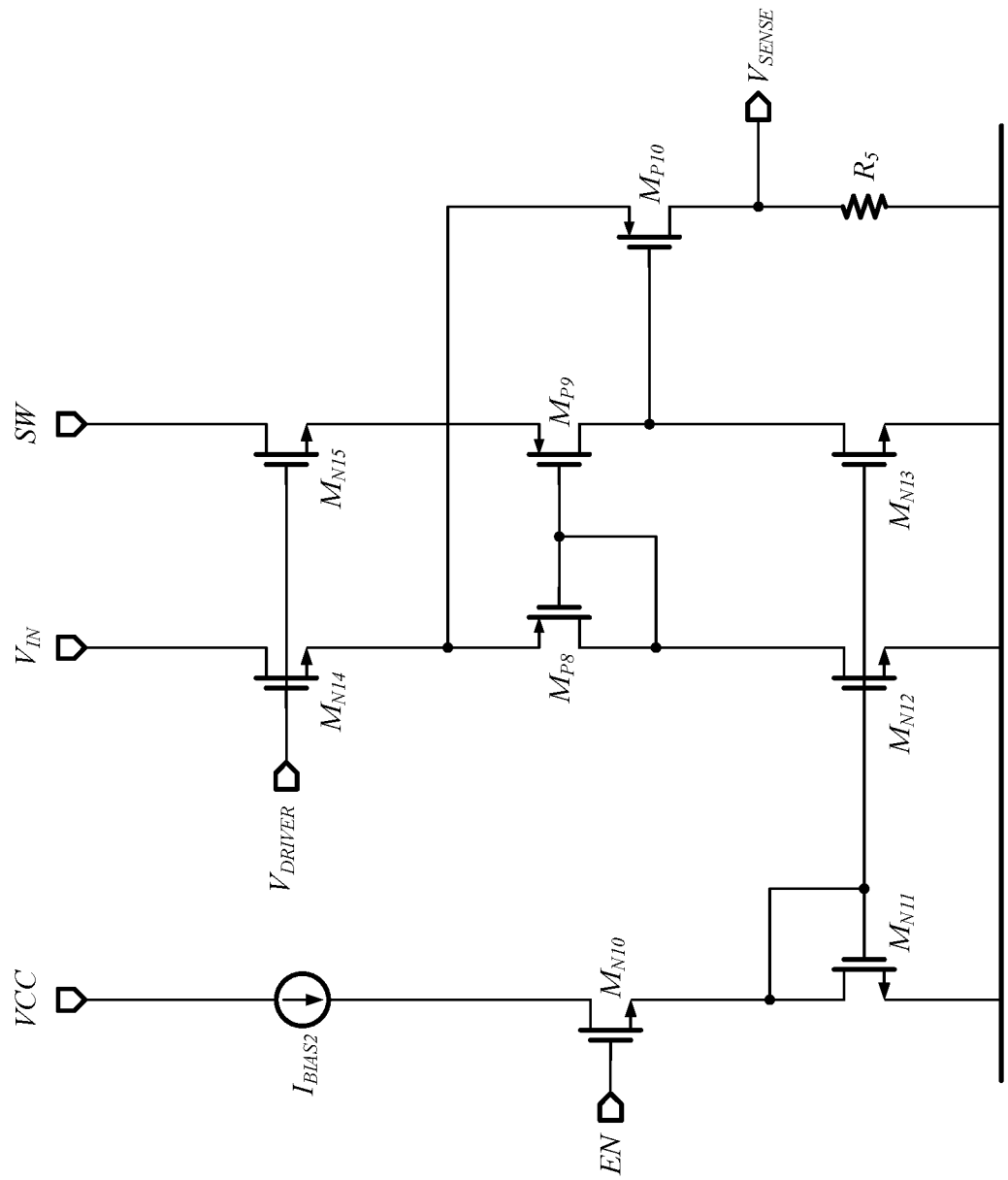
FIG. 10: The current sensing circuit in the present invention.

FIG. 7 shows the circuit structure of the variable capacitor $C_2$. In the voltage mode, the enable signal is low, the switch $S_1$ is a PMOS switch, and the switch $S_2$ is an NMOS switch. The enable signal is connected to the gates of the switch transistors, wherein in the figure, the switch $S_1$ is on and $S_2$ is off, so the capacitance value is $$C_2 = C_{AB} = C_{M9} + C_{M10} + C_{M11} + C_{M12} + C_{M13} + C_{M14} + C_{M15} + C_{M16}.$$

In the current mode, the switch $S_1$ in the figure is off and $S_2$ is on. At this time, the capacitance value is $C_2 = C_{AB} = C_{M1} + C_{M2} + C_{M3} + C_{M4} + C_{M5} + C_{M6} + C_{M7} + C_{M8}$.

By changing the values of variable resistors and variable capacitors in different modes, a suitable loop compensation network can be obtained in voltage mode and current mode, so that the system can have better loop stability in two working modes.

The above described are only some example embodiments of the present invention, and do not limit the scope of the present invention. Any equivalent structural changes made by those skilled in the field using the content of the present invention are included in the scope of patent protection of the present invention.

The invention claimed is:

1. A DC-DC converter circuit, comprising: a driving circuit, a current sensing circuit, an oscillator, a mode selection circuit, a pulse width modulator, a slope compensation circuit, an error amplifier, a compensation module, a first NMOS transistor, a second NMOS transistor, an inductor, a first capacitor, a first resistor, a second resistor, and a third resistor, wherein:
the driving circuit includes an input terminal and two output terminals,
the current sensing circuit includes four input terminals and an output terminal,
the slope compensation circuit includes three input ports and an output port,
the first NMOS transistor includes a drain connected to a first one of the input ports of the current sensing circuit and to an input current source, a source connected to a drain of the second NMOS transistor, a second one of the input ports of the current sensing circuit, and a first end of the inductor, and a gate connected to a first one of the output ports of the driving circuit,
a second one of the output ports of the driving circuit is connected to a gate of the second NMOS transistor,
the inductor, has a second end connected to a first terminal of the first capacitor, a first end of the first resistor, and a first end of the third resistor,
the first resistor has a second end connected to a first end of the second resistor,
the second NMOS transistor has a source connected to a second terminal of the first capacitor, a second end of the third resistor, and a second end of the second resistor,
the second end of the first resistor and the first end of the second resistor are connected to a first input terminal of the error amplifier,
the error amplifier has a second input terminal receiving a first reference voltage and an output terminal connected to a first input terminal of the pulse width modulator,
the pulse width modulator has an output terminal connected to the input terminal of the driving circuit,
the mode selection circuit has an input receiving a mode selection signal and an output connected to a third one of the input ports of the current sensing circuit and a first one of the input ports of the slope compensation circuit,
the output port of the current sensing circuit is connected to the slope compensation circuit,
the oscillator has an output connected to a second one of the input ports of the slope compensation circuit,
the output port of the slope compensation circuit is connected to a second input terminal of the pulse width modulator;
the compensation module includes a first operational amplifier, a first variable resistor, a second variable resistor, and a variable capacitor, and
the first operational amplifier has an output terminal, a first input terminal and a second input terminal, wherein the output terminal is connected to the first input terminal, the first input terminal and the second input terminal are respectively connected to first and second ends of the second variable resistor, the second input terminal is connected to a first end of the first variable resistor, a second end of the first variable resistor is connected to the variable capacitor and the first input terminal of the pulse width modulator, and the variable capacitor is grounded.

2. The DC-DC converter circuit as claimed in claim 1, wherein the current sensing circuit includes a first bias current source, third through eighth NMOS transistors, first, second and third PMOS transistors, and a fourth resistor;
the first bias current source is connected to an internal power supply voltage and a drain of the third NMOS transistor,
a gate of the third NMOS transistor is the third one of the input ports of the current sensing circuit,
the third NMOS transistor has a source connected to a drain and a gate of the fourth NMOS transistor and a gate of each of the fifth and sixth NMOS transistors,
each of the fourth, fifth and sixth NMOS transistors has a source connected to ground,
the fifth NMOS transistor has a drain is connected to a drain and a gate of the first PMOS transistor and a gate of the second PMOS transistor,
the first PMOS transistor has a source connected to a source of the third PMOS transistor and a source of the seventh NMOS transistor,
gates of the seventh and eighth NMOS transistors are connected together as a fourth one of the input ports of the current sensing circuit,
the seventh NMOS transistor has a drain that is the first one of the input ports of the current sensing circuit,
the eighth NMOS transistor has a drain that is the second one of the input ports of the current sensing circuit and a source that is connected to a source of the second PMOS transistor,
the second PMOS transistor has a drain connected to a gate of the third PMOS transistor and a drain of the sixth NMOS transistor,
a drain of the third PMOS transistor is connected to a first end of the fourth resistor and is the output terminal of the current sensing circuit, and
a second end of the fourth resistor is grounded.

3. The DC-DC converter circuit as claimed in claim 1, wherein the slope compensation circuit includes a second operational amplifier, a fifth resistor, fourth through sixth PMOS transistors, ninth through fourteenth NMOS transistors, and second and third capacitors;
the second operational amplifier has a first input terminal connected to a second reference voltage, a second input terminal connected to a first end of the fifth resistor and a source of the fourth PMOS transistor, and an output connected to a gate of the fourth PMOS transistor,
the fifth resistor has a second end connected to an input supply voltage,
a drain of the fourth PMOS transistor is connected to a gate and drain of the ninth NMOS transistor and gates of the tenth, eleventh and twelfth NMOS transistors,
the ninth NMOS transistor has a source connected to a drain of the tenth NMOS transistor,
the tenth NMOS transistor has a source that is grounded,
the eleventh NMOS transistor has a source connected to a drain of the twelfth NMOS transistor,
the twelfth NMOS transistor has a source that is grounded,
the eleventh NMOS transistor has a drain connected to a drain and a gate of the fifth PMOS transistor and a gate of the sixth PMOS transistor,
the fifth and sixth PMOS transistors each have a source connected to the internal power supply voltage,
the sixth PMOS transistor has a drain connected to a first terminal of the second capacitor and a drain of each of the thirteenth and fourteenth NMOS transistors,
the thirteenth NMOS transistor has a gate that is the first one of the input ports of the slope compensation circuit and a source connected to a first terminal of the third capacitor,
the second and third capacitors each have a second terminal connected to a source of the fourteenth NMOS transistor,
the second terminal of the second and third capacitors and the source of the fourteenth NMOS transistor are the third one of the input ports of the slope compensation circuit, and
the fourteenth NMOS transistor has a gate that is the second one of the input ports of the slope compensation circuit.

4. The DC-DC converter circuit as claimed in claim 1, wherein the mode selection circuit includes: a sixth resistor, a diode, a first inverter, and a second inverter;
the sixth resistor has a first one end receiving the mode selection signal and a second end connected to an output of the diode, and an input of the first inverter,
the diode has an input connected to ground,
the first inverter has an output connected to an input of the second inverter, and
the second inverter has an output that is the output of the mode selection circuit.

5. The DC-DC converter circuit with selectable working modes as claimed in claim 1, wherein the circuit of the variable resistor and the variable resistor is two parallel branches, one end is the input end and the other is the output end, each branch includes a plurality of resistors and a switch, and the switch is a MOS transistor.

6. The DC-DC converter circuit with selectable working modes as claimed in claim 1, wherein the circuit of the variable capacitor is two parallel branches, one end is the input end and the other is the output end, each branch includes a switch and a plurality of parallel capacitors, and the switch is a MOS transistor.

7. The DC-DC converter circuit as claimed in claim 1, wherein the oscillator includes a second bias current source, a seventh resistor, fifteenth and sixteenth NMOS transistors, seventh through twelfth PMOS transistors, fourth and fifth capacitors, first and second comparators, an RS flip-flop and third through sixth inverters;
the second bias current source is connected to ground a first end of the seventh resistor, and gates of the seventh, ninth and eleventh PMOS transistors,
the seventh resistor has a second end connected to a drain of the seventh PMOS transistor and gates of the eighth, tenth and twelfth PMOS transistors,
the seventh PMOS transistor has a source connected to a drain of the eighth PMOS transistor,
each of the eighth, tenth and twelfth PMOS transistors has a source connected to the internal power supply voltage,
the tenth PMOS transistor has a drain connected to a source of the ninth PMOS transistor,
the twelfth PMOS transistor has a drain connected to a source of the eleventh PMOS transistor,
the ninth PMOS transistor has a source connected to a first terminal of the fourth capacitor, a drain of the fifteenth NMOS transistor, and a first input terminal of the second comparator,
a second terminal of the fourth capacitor and a source of the fifteenth NMOS transistor are connected to ground, the eleventh PMOS transistor has a drain connected to a first terminal of the fifth capacitor, a drain of the sixteenth NMOS transistor, and a first input of the first comparator, a second terminal of the fifth capacitor and a source of the sixteenth NMOS transistor are connected to ground, the first comparator and the second comparator each have a second input terminal receiving the first reference voltage, the first comparator has an output connected to a first terminal of the RS flip-flop, the second comparator has an output connected to a second terminal of the RS flip-flop, the RS flip-flop has an output connected to the third inverter and the fifth inverter, the third inverter has an output connected to an input of the fourth inverter, the fourth inverter outputs a clock signal, the fifth inverter has an output connected to a gate of the sixteenth NMOS transistor and an input of the sixth inverter, and the sixth inverter has an output connected to a gate of the fifteenth NMOS transistor.

8. The DC-DC converter circuit as claimed in claim 7, wherein the clock signal is the output of the oscillator.

9. The DC-DC converter circuit as claimed in claim 1, wherein the first output port of the driving circuit is connected to the fourth one of the input ports of the current sensing circuit.

10. The DC-DC converter circuit as claimed in claim 1, wherein the output port of the current sensing circuit is connected to a third one of the input ports of the slope compensation circuit.

11. The DC-DC converter circuit as claimed in claim 1, wherein the second end of the first variable resistor is connected to a first terminal of the variable capacitor, and the variable capacitor has a second terminal connected to a ground potential.

* * * * *